(12) United States Patent
Kunz

(10) Patent No.: US 10,967,861 B2
(45) Date of Patent: *Apr. 6, 2021

(54) USING DISCOMFORT FOR SPEED PLANNING IN RESPONDING TO TAILGATING VEHICLES FOR AUTONOMOUS VEHICLES

(71) Applicant: Waymo LLC, Mountain View, CA (US)

(72) Inventor: Tobias Kunz, San Francisco, CA (US)

(*) Notice: Subject to any disclaimer, the term of this patent is extended or adjusted under 35 U.S.C. 154(b) by 158 days.

This patent is subject to a terminal disclaimer.

(21) Appl. No.: 16/188,619

(22) Filed: Nov. 13, 2018

(65) Prior Publication Data

US 2020/0148204 A1     May 14, 2020

(51) Int. Cl.
  *B60W 30/16* (2020.01)
  *G05D 1/02* (2020.01)
  *G05D 1/00* (2006.01)

(52) U.S. Cl.
  CPC ......... *B60W 30/162* (2013.01); *G05D 1/0088* (2013.01); *G05D 1/0223* (2013.01); *G05D 2201/0213* (2013.01)

(58) Field of Classification Search
  CPC .. B60W 30/162; G05D 1/0088; G05D 1/0223
  See application file for complete search history.

(56) References Cited

U.S. PATENT DOCUMENTS

| | | | |
|---|---|---|---|
| 8,412,449 B2 | 4/2013 | Trepagnier et al. | |
| 8,676,466 B2 | 3/2014 | Mudalige | |
| 8,712,663 B1 | 4/2014 | Zeng | |
| 8,788,134 B1 | 7/2014 | Litkouhi et al. | |
| 8,930,058 B1 | 1/2015 | Quist | |
| 9,014,905 B1 | 4/2015 | Kretzschmar et al. | |
| 9,248,834 B1 | 2/2016 | Ferguson et al. | |
| 9,254,846 B2 | 2/2016 | Dolgov et al. | |
| 9,494,439 B1 * | 11/2016 | Ross | G08G 1/161 |

(Continued)

FOREIGN PATENT DOCUMENTS

WO     2017087199 A1     5/2017

OTHER PUBLICATIONS

International Search Report and Written Opinion for Application No. PCT/US2018/062044 dated Mar. 14, 2019.

(Continued)

*Primary Examiner* — Hussein Elchanti
(74) *Attorney, Agent, or Firm* — Botos Churchill IP Law

(57) ABSTRACT

Aspects of the disclosure relate to controlling a first vehicle in an autonomous driving mode. While doing so, a second vehicle may be identified. This vehicle may be determined to be a tailgating vehicle. An initial allowable discomfort value representing expected discomfort of an occupant of the first vehicle and expected discomfort of an occupant of the second vehicle may be identified. Determining a speed profile for a future trajectory of the first vehicle that meets the value may be attempted based on a set of factors corresponding to a reaction of the tailgating vehicle. When a speed profile that meets the value cannot be determined, the value may be adjusted until a speed profile that meets the value is determined. The speed profile that meets an adjusted value is used to control the first vehicle in the autonomous driving mode.

21 Claims, 12 Drawing Sheets

(56) References Cited

U.S. PATENT DOCUMENTS

| | | | |
|---|---|---|---|
| 10,627,825 B2* | 4/2020 | Gutmann | B60W 30/10 |
| 2004/0030499 A1 | 2/2004 | Knoop et al. | |
| 2006/0273922 A1 | 12/2006 | Bhogal et al. | |
| 2010/0106356 A1 | 4/2010 | Trepagnier et al. | |
| 2010/0204896 A1 | 8/2010 | Biondo et al. | |
| 2010/0312434 A1 | 12/2010 | Schutyser et al. | |
| 2011/0184605 A1 | 7/2011 | Neff | |
| 2012/0218093 A1 | 8/2012 | Yoshizawa et al. | |
| 2013/0197758 A1 | 8/2013 | Ueda et al. | |
| 2015/0224845 A1* | 8/2015 | Anderson | B60G 17/052 |
| | | | 701/37 |
| 2015/0291216 A1 | 10/2015 | Sato | |
| 2015/0346723 A1 | 12/2015 | Pedersen | |
| 2016/0023656 A1 | 1/2016 | Matsumura | |
| 2016/0200317 A1 | 7/2016 | Danzl et al. | |
| 2016/0318513 A1 | 11/2016 | Lee | |
| 2017/0039855 A1 | 2/2017 | Maeda et al. | |
| 2017/0090478 A1 | 3/2017 | Blayvas | |
| 2017/0113686 A1* | 4/2017 | Horita | B60W 30/09 |
| 2017/0120902 A1 | 5/2017 | Kentley et al. | |
| 2017/0136842 A1 | 5/2017 | Anderson et al. | |
| 2017/0329332 A1 | 11/2017 | Pilarski et al. | |
| 2018/0004211 A1* | 1/2018 | Grimm | G05D 1/0214 |
| 2018/0032082 A1 | 2/2018 | Shalev-Shwartz | |
| 2018/0141568 A1* | 5/2018 | Singhal | B60W 40/105 |
| 2018/0162409 A1* | 6/2018 | Altmannshofer | |
| | | | G08G 1/096708 |
| 2018/0197415 A1* | 7/2018 | Kurata | B60W 50/14 |
| 2018/0326980 A1 | 11/2018 | He | |
| 2019/0025067 A1* | 1/2019 | Barecke | G06K 9/00805 |
| 2019/0056743 A1 | 2/2019 | Alesiani | |
| 2019/0064813 A1* | 2/2019 | Binet | G05D 1/0212 |
| 2019/0072973 A1* | 3/2019 | Sun | G05D 1/0221 |
| 2019/0286154 A1 | 9/2019 | Shalev-Shwartz et al. | |
| 2019/0286157 A1 | 9/2019 | Shalev-Shwartz et al. | |
| 2019/0291726 A1 | 9/2019 | Shalev-Shwartz et al. | |

OTHER PUBLICATIONS

File History for U.S. Appl. No. 15/258,324, filed Sep. 7, 2016.
Glaser, Sébastien, et al., "Maneuver Based Trajectory Planning for Highly Autonomous Vehicles on Real Road With Traffic and Driver Interaction", May 10, 2010, 15 pages.

* cited by examiner

USING DISCOMFORT FOR SPEED PLANNING IN RESPONDING TO TAILGATING VEHICLES FOR AUTONOMOUS VEHICLES

CROSS-REFERENCE TO RELATED APPLICATIONS

The present application is related to U.S. patent application Ser. No. 15/820,757, filed Nov. 22, 2017, the disclosure of which is incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location, for instance, by determining and following a route which may require the vehicle to respond to and interact with other road users such as vehicles, pedestrians, bicyclists, etc.

BRIEF SUMMARY

Aspects of the disclosure provide a method of controlling a first vehicle. The method includes while maneuvering the first vehicle in an autonomous driving mode, identifying, by one or more processors, a second vehicle; determining, by the one or more processors, that the second vehicle is a tailgating vehicle; identifying, by the one or more processors, an initial allowable discomfort value representing expected discomfort of an occupant of the first vehicle and expected discomfort of an occupant of the second vehicle; attempting, by the one or more processors, to determine a speed profile for a future trajectory of the first vehicle that meets the initial allowable discomfort value based on a set of factors corresponding to a reaction of the tailgating vehicle; when a speed profile that meets the initial allowable discomfort value cannot be determined, adjusting, by the one or more processors, the initial allowable discomfort value until a speed profile that meets an adjusted allowable discomfort value is determined; and using, by the one or more processors, the speed profile that meets the adjusted allowable discomfort value to control the first vehicle in the autonomous driving mode.

In one example, the set of factors includes a maximum allowed deceleration for the second vehicle. In another example, the method also includes, when the initial allowable discomfort value is adjusted, the maximum allowed deceleration for the second vehicle is also adjusted. In this example, adjusting the maximum allowed deceleration includes increasing a limit on expected deceleration for the second vehicle. In another example, the set of factors includes a reaction time for the second vehicle. In this example, when the initial allowable discomfort value is adjusted, the reaction time for the second vehicle is also adjusted. In addition, adjusting the reaction time includes decreasing the reaction time. In another example, the set of factors further includes a constraint for stopping the first vehicle at an intersection. In this example, when the initial allowable discomfort value is adjusted, the constraint for stopping the first vehicle at an intersection is adjusted. In another example, when the initial allowable discomfort value is adjusted, the constraint for stopping the first vehicle at an intersection is ignored. In another example, determining that the second vehicle is a tailgating vehicle is based on a location of the second vehicle with respect to the first vehicle. In this example, determining that the second vehicle is a tailgating vehicle is based on a speed of the second vehicle. In another example, the method also includes periodically updating the determination of whether the second vehicle is a tailgating vehicle. In another example, the method also includes while maneuvering the first vehicle in an autonomous driving mode, identifying, by one or more processors, a third vehicle; determining, by the one or more processors, that the third vehicle is not a tailgating vehicle, and attempting to determine the speed profile for the geometry that meets the initial allowable discomfort value is further based on a second set of factors relating to the third vehicle. In this example, the set of factors includes a first value for a maximum allowed deceleration for the second vehicle, and the second set of factors includes a second value for the maximum allowed deceleration for the third vehicle, and the second value is different from the first value. In addition, the first value allows for a first limit on expected deceleration for the second vehicle, the second value allows for a second limit on expected deceleration for the third vehicle, and the first limit is less than the second limit. In addition or alternatively, the set of factors includes a first value for a reaction time for the second vehicle, and the second set of factors includes a second value for the reaction time for the third vehicle, and the second value is different from the first value. In addition, the first value is less than the second value, such that the reaction time of the second vehicle is less than the reaction time of the third vehicle.

Another aspect of the disclosure provides a system for controlling a first vehicle. The system comprising one or more processors configured to, while maneuvering the first vehicle in an autonomous driving mode, identify a second vehicle; determine that the second vehicle is a tailgating vehicle; identify an initial allowable discomfort value representing expected discomfort of an occupant of the first vehicle and expected discomfort of an occupant of the second vehicle; attempt to determine a speed profile for a future trajectory of the first vehicle that meets the initial allowable discomfort value based on a set of factors corresponding to a reaction of the tailgating vehicle; when a speed profile that meets the initial allowable discomfort value cannot be determined, adjust the initial allowable discomfort value until a speed profile that meets an adjusted allowable discomfort value is determined; and use the speed profile that meets the adjusted allowable discomfort value to control the first vehicle in the autonomous driving mode.

In one example, the one or more processors are further configured to, while maneuvering the first vehicle in an autonomous driving mode, identify a third vehicle; and determine that the third vehicle is not a tailgating vehicle. In this example, attempting to determine the speed profile for the geometry that meets the initial allowable discomfort value is further based on a second set of factors relating to the third vehicle, the set of factors includes a first value for a maximum allowed deceleration for the second vehicle, the second set of factors includes a second value for the maximum allowed deceleration for the third vehicle, and the second value is different from the first value. In another example, the system also includes the vehicle.

DETAILED DESCRIPTION

Overview

Figure 1:
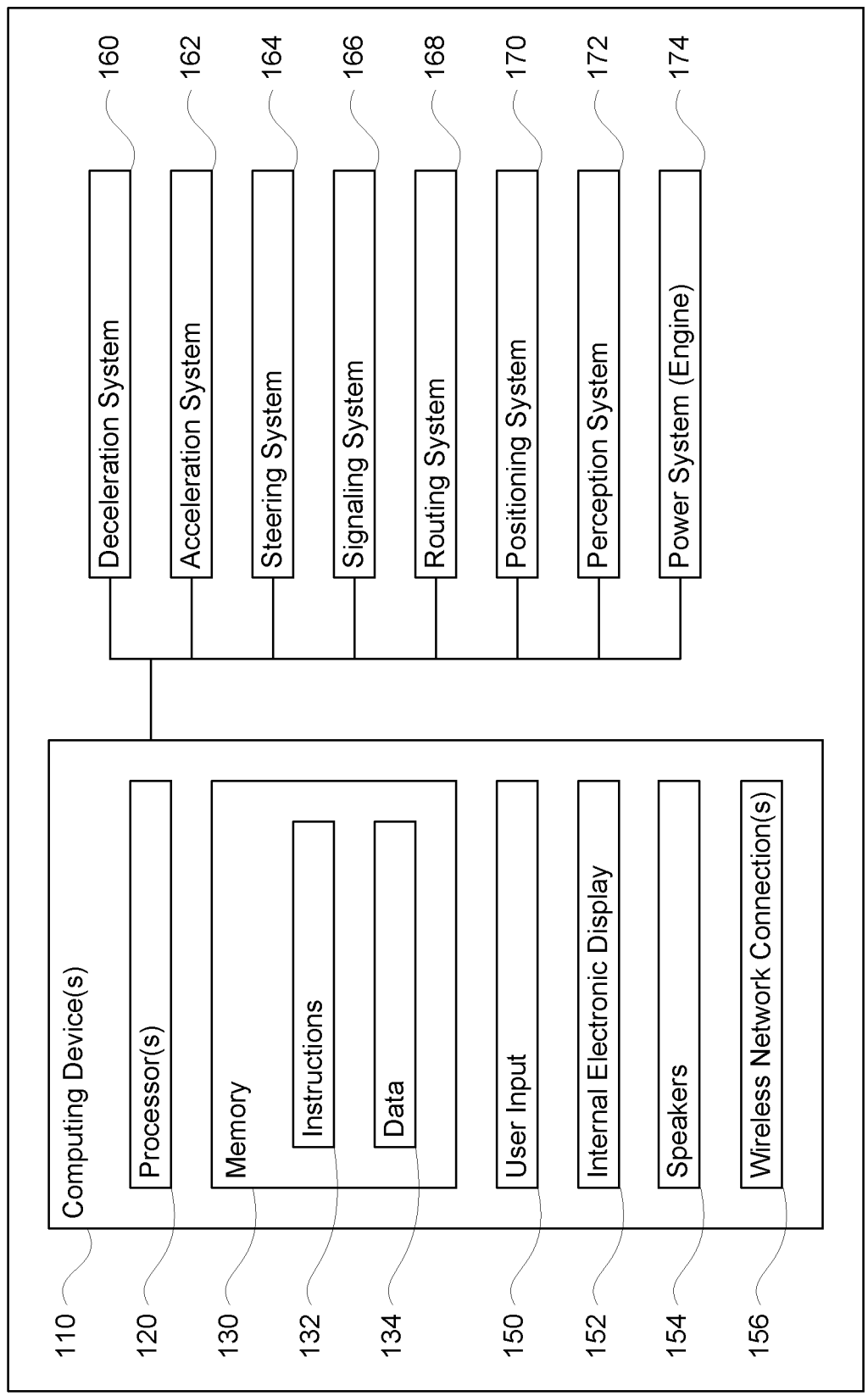
FIG. 1 is a functional diagram of an example vehicle in accordance with an exemplary embodiment.

The technology relates to using a discomfort value to determine how to control an autonomous vehicle's speed. When generating a vehicle's trajectory, the geometry of the autonomous vehicle's path may be determined before determining a speed profile for that trajectory. In some instances, the autonomous vehicle's computing devices may detect an object, such as another road user, behind the vehicle. In some instances, these objects may be tailgating vehicles, as such, it can be important to consider how the vehicle's behavior will affect these tailgating vehicles. In order to do so, a discomfort value which suggests discomfort for the vehicle as well as road users in the vehicle's environment, for instance, other vehicles, bicyclists, or pedestrians, may be used.

In order for the vehicle's computing devices to maneuver the vehicle autonomously, the computing devices must generate trajectories, or future paths for the vehicle to follow over some brief period into the future. These future paths may include a geometry component and a speed component or speed profile. The speed profile may be generated after the geometry component. In this regard, for any given geometry, a number of different possible speed profiles may be generated, including for instance, those that require the vehicle to speed up or to slow down. Again, deciding which of these speed profiles to use can be a challenge.

When determining a speed profile, the computing devices may generate a plurality of constraints. These constraints may be generated based on objects in the vehicle's environment as well as their predicted behaviors or trajectories. In some instances, the constraints may be generated based only on objects that are in front of and/or alongside of the vehicle. In that regard, objects behind the vehicle may be ignored. However, in some instances, when an object located behind the vehicle is determined to be a tailgating vehicle, a constraint may also be generated for that object.

The computing devices may also attempt to determine a speed profile for a given geometry that minimizes a discomfort value for the autonomous vehicle as well as the other vehicle to identify a speed profile. A discomfort value may be determined based on a combination of factors relating to expected discomfort experienced by a passenger of the autonomous vehicle (whether or not the autonomous vehicle actually includes a passenger) and a passenger or occupant of another vehicle (whether or not the another vehicle actually includes a passenger), pedestrian, or bicyclist, etc.

In other words, the computing devices may determine whether there is a solution (i.e. a speed profile) with an associated discomfort value that will satisfy or meet a maximum allowable discomfort value. For instance, for a given maximum allowable discomfort value, the computing devices may return a speed profile for that maximum allowable discomfort value or a failure if within the limits of that maximum allowable discomfort value no solution can be found. This results in the computing devices choosing a speed plan with the lowest feasible maximum allowable discomfort value. The computing devices may search for speed profiles iteratively using different maximum allowable discomfort values. For instance, the computing devices start with an initial or lowest maximum allowable discomfort value. If the computing devices are unable to find a speed profile at that maximum allowable discomfort value, the computing devices may increase the maximum allowable discomfort value until a solution, or speed profile that meets the current maximum allowable speed discomfort value, is found.

For a given maximum allowable discomfort value, the vehicle's computing devices may start with a speed profile that moves as fast as possible given limits on velocity, such as road speed limits and lateral acceleration limits in turns, and slow regions (defined by map information). This initial profile may not necessarily satisfy the constraints, including any constraint generated for an object determined to be tailgating vehicle. Those constraints are resolved one by one. If the computing devices can't satisfy the constraints even when braking as hard and as early as possible for the maximum allowable discomfort value, the given maximum allowable discomfort value may be increased and new speed profiles generated. However, if the speed profile can both pass or yield to another vehicle at the given maximum allowable discomfort value, the computing devices may select a default action, such as speeding up to pass the other object. In addition, as the maximum allowable discomfort value is increased, certain constraints may even be ignored.

The computing device may then control the vehicle according to the speed profile that meets the smallest maximum allowable discomfort value. The discomfort value may be used when generating all speed profiles, but can be especially useful when the autonomous is in certain types of situation which requires that the autonomous vehicle either speed up or slow down while interacting with another vehicle.

The features described herein may allow an autonomous vehicle to determine a speed profile while considering how that speed profile will affect both any passengers of the autonomous vehicle (even if there are currently none in the vehicle) as well as any passenger or occupants of another vehicle with which the autonomous vehicle is interacting. In addition, by generating constraints based on tailgating vehicles, the vehicle's computing devices are able to make driving decisions which also consider how the vehicle's behavior will affect those tailgating vehicles. This also increases safety. In other words, using more conservative estimates for predicting the behavior of other objects and using larger safety margins at lower maximum allowable discomfort values results in a safer solution.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
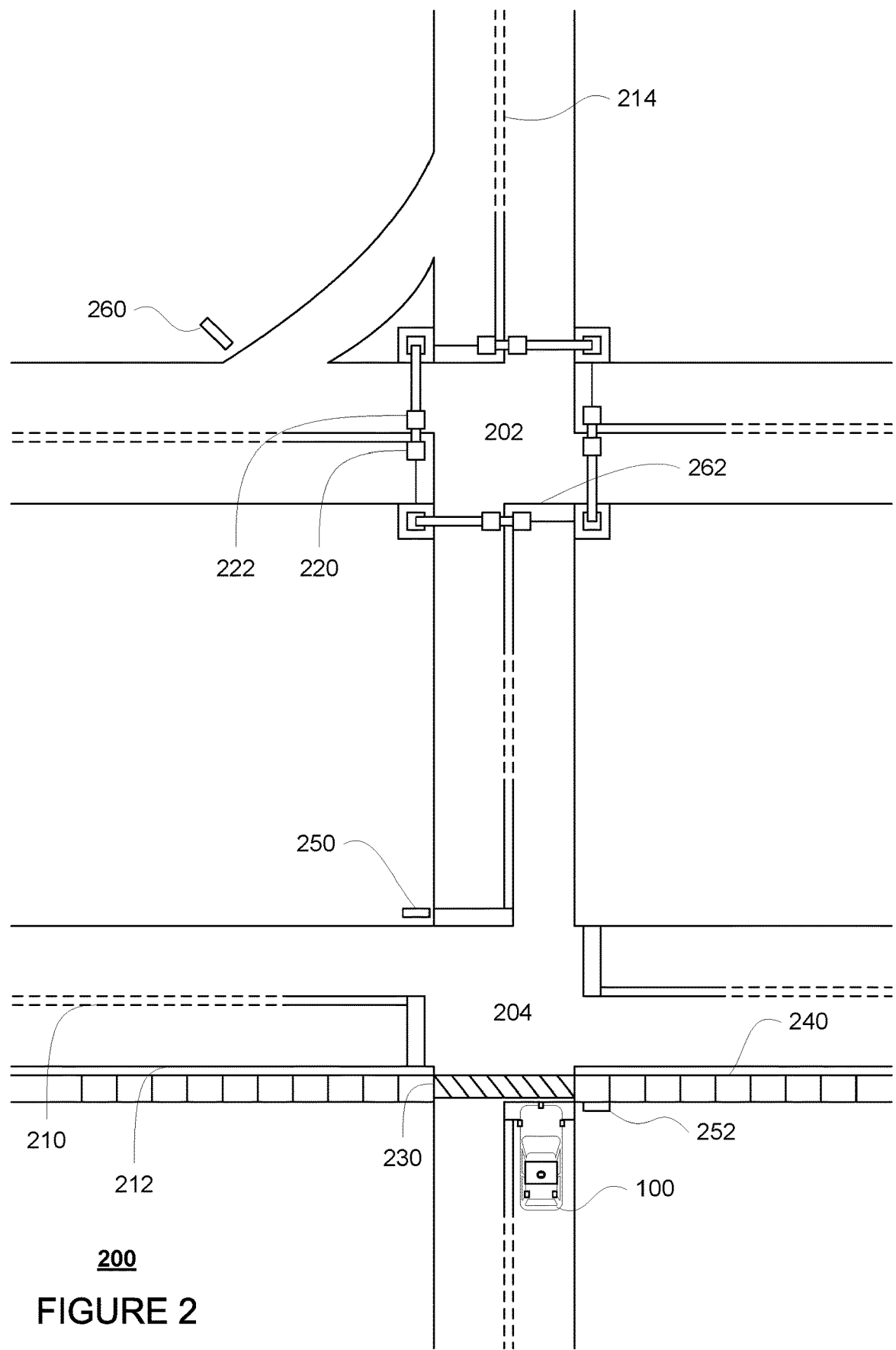
FIG. 2 is an example of map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, yield sign 260, and stop line 262. Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
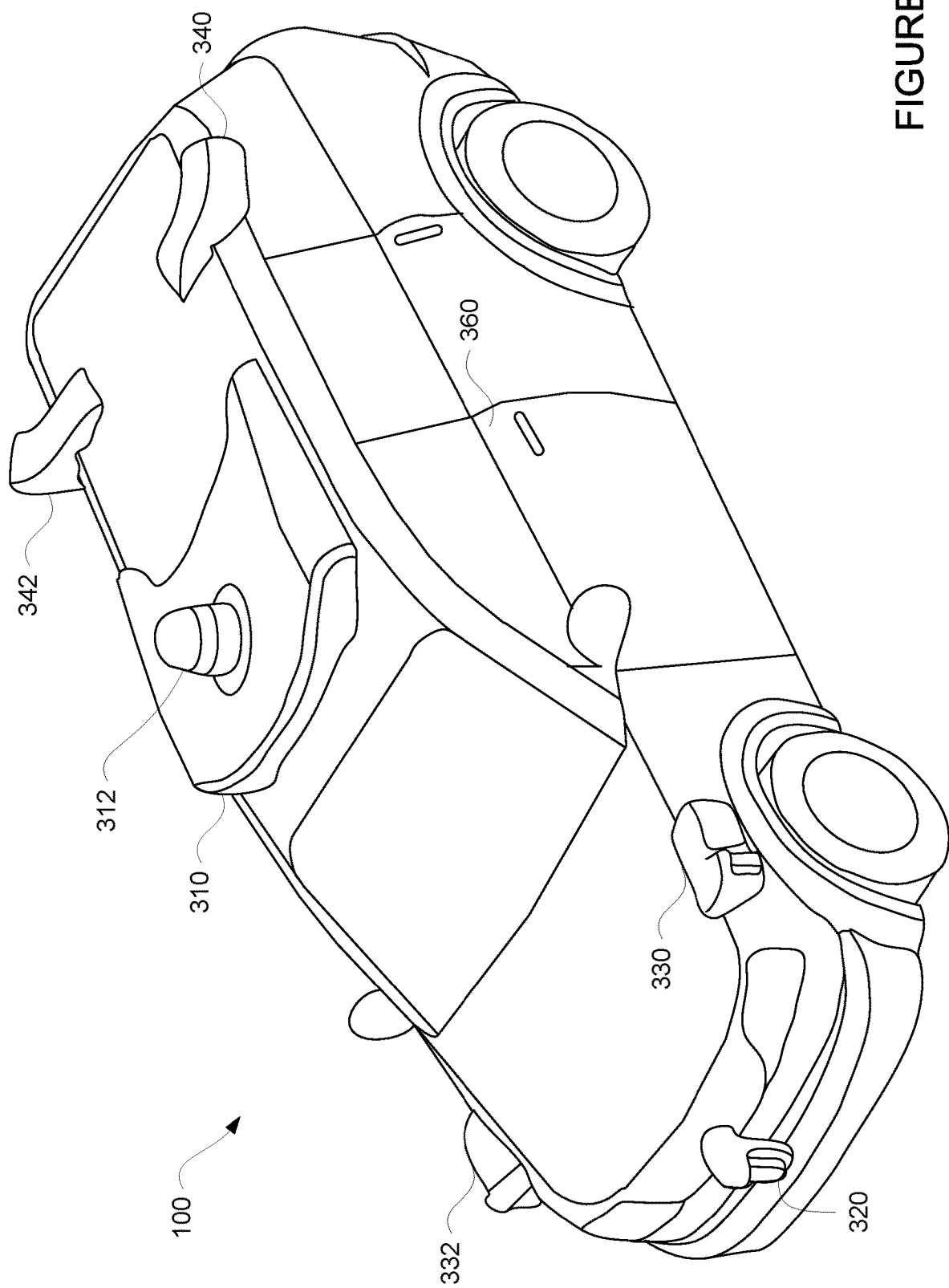
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
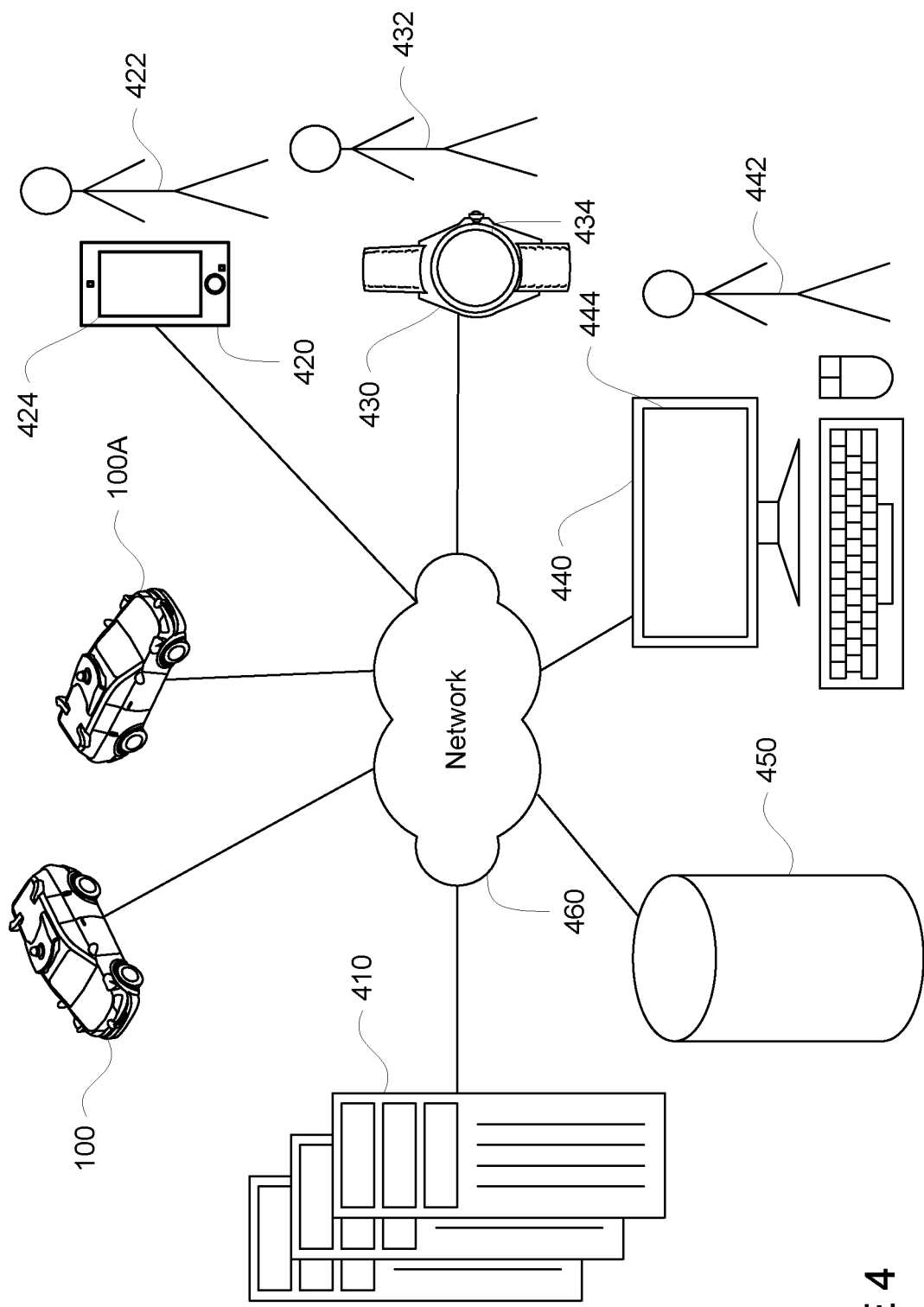
FIG. 4 is a pictorial diagram of an example system in accordance with an exemplary embodiment.
Figure 5:
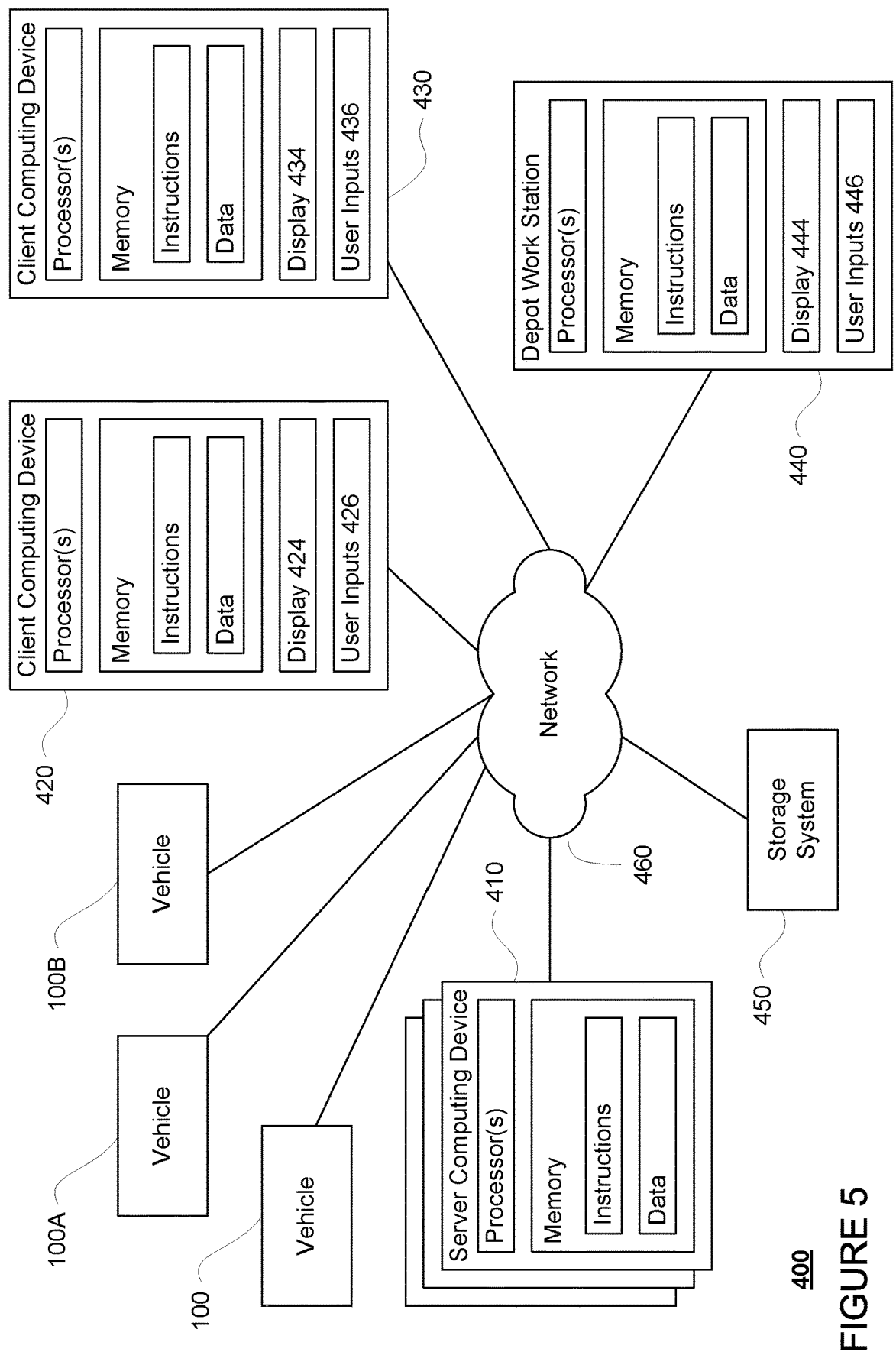
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching system. In addition, the vehicles of the fleet may periodically send the server computing devices location information provided by the vehicle's respective positioning systems as well as other information relating to the status of the vehicles discussed further below, and the one or more server computing devices may track the locations and status of each of the vehicles of the fleet.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be a concierge work station used by an administrator or operator of a depot to provide depot services for the vehicles of the fleet. Although only a single depot work station 440 is shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. In order to provide transportation services to users, the information of storage system 450 may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), one or more unique signals for the user as well as other user preference or settings data.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

The vehicle's computing devices may control the vehicle in order to follow a route. This may include generating a plurality of short term trajectories for the vehicle. These trajectories may be essentially future paths for the vehicle to follow over some brief period into the future, such as 2 seconds, 10 seconds, 16 seconds or more or less, in order to follow the route to the destination. These future paths may include a geometry component and a speed component or speed profile. The speed profile may be generated after the geometry component. In this regard, for any given geometry, a number of different possible speed profiles may be generated, including for instance, those that require the vehicle to speed up or to slow down. Again, deciding which of these speed profiles to use can be a challenge.

Figure 6:
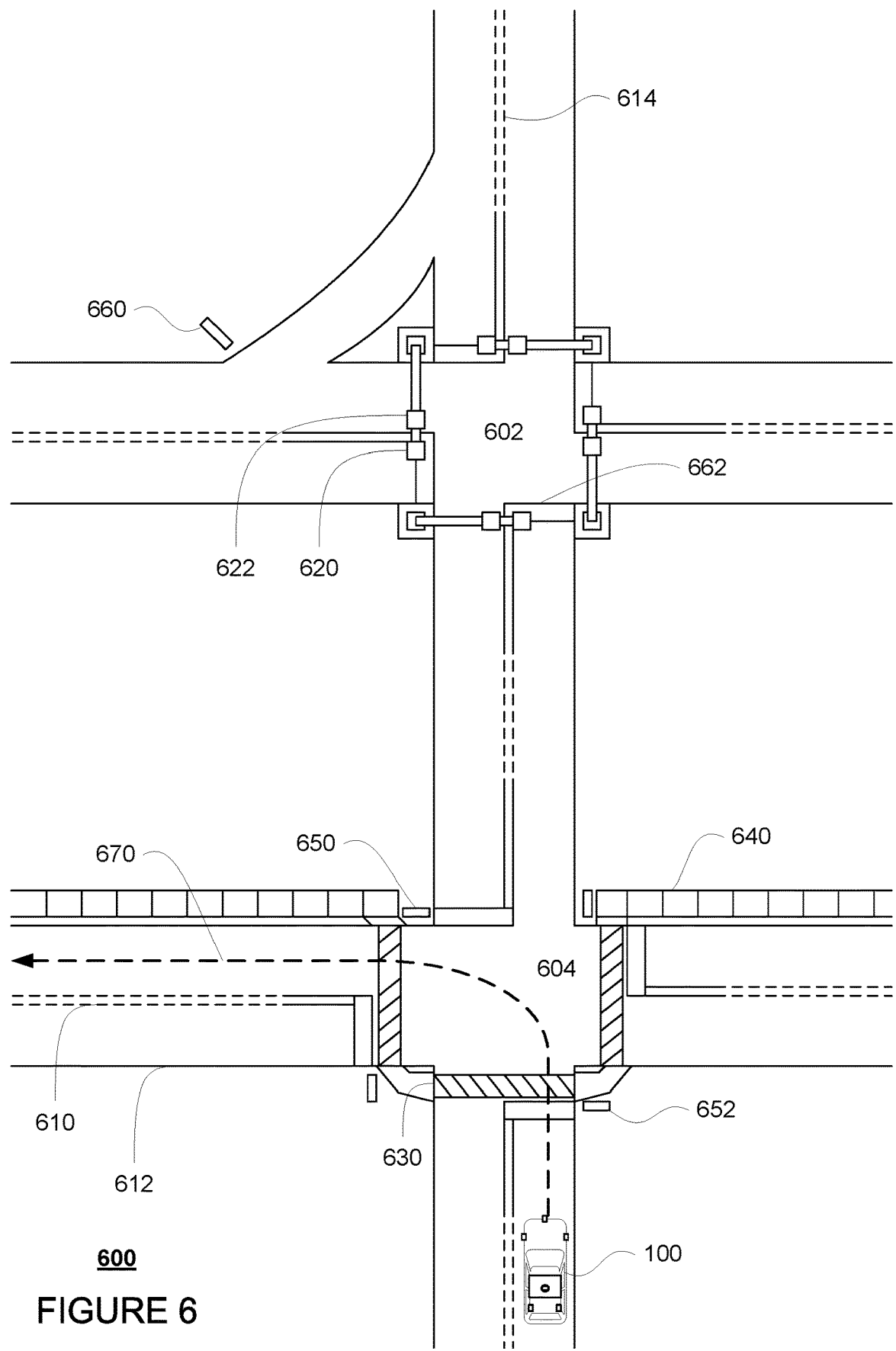
FIG. 6 is an example bird's eye view of a geographic area in accordance with aspects of the disclosure.

FIG. 6 is an example view of vehicle 100 being maneuvered on a section of roadway corresponding to the section of roadway defined in the map information of FIG. 2. For instance, FIG. 6 depicts vehicle 100 being maneuvered on a section of roadway 600 including intersections 602 and 604. In this example, intersections 602 and 604 correspond to intersections 202 and 204 of the map information 200, respectively. In this example, lane lines 610, 612, and 614 correspond to the shape, location, and other characteristics of lane lines 210, 212, and 214, respectively. Similarly, crosswalk 630 corresponds to the shape, location, and other characteristics of crosswalk 230, respectively; sidewalks 640 correspond to sidewalks 240; traffic signal lights 620, 622 correspond to traffic signal lights 220, 222, respectively; stop signs 650, 652 correspond to stop signs 250, 252, respectively; yield sign 660 corresponds to yield sign 260; and stop line 662 corresponds to stop line 262.

In this example, the computing devices 110 have used map information 200 to determine a trajectory 670 for vehicle 100 to follow in order to reach a destination (not shown). Trajectory 670 includes a speed component and geometry component (same as what is shown in FIG. 6 for trajectory 670) that will require that vehicle 100 make a left turn at intersection 604.

The computing devices 100 may then attempt to determine a speed profile for a given geometry, such as the geometry trajectory 670, that minimizes a discomfort value for passengers or occupants of the autonomous vehicle as well as other road users in the vehicle's environment, including any objects identified as tailgating vehicles. A discomfort value may be determined based on a combination of factors relating to expected discomfort experienced by a passenger or occupant of the autonomous vehicle (whether or not the autonomous vehicle actually includes a passenger) and a passenger or occupant of another vehicle (whether or not the another vehicle actually includes any occupant), pedestrian, or bicyclist, etc. This discomfort value may be determined based on a combination of factors including, for instance, maximum deceleration, maximum acceleration, maximum jerk, maximum lateral acceleration, maximum lateral jerk, maximum amount that autonomous vehicle will exceed a speed limit whether the autonomous vehicle will have to enter a crosswalk, whether the vehicle will have to enter an occluded crosswalk, whether the vehicle's speed will surpass a proximity speed limit, minimum distance between the vehicle and any other objects (for instance, how close together the two vehicles will come), etc. With regard to the proximity speed limit, this may correspond to limiting the speed of the vehicle as a function of the distance to a nearby object. This limit may correspond to a limit on an absolute speed, a relative speed, a percentage of the speed limit for the roadway on which the vehicle is currently driving, etc.

In addition to these factors, for another road user, such as another vehicle, bicyclist or pedestrian, the factors may also include a reaction time for the other road user to react to the vehicle 100, how much the other object will have to decelerate, when the other road user will be able to see or detect the vehicle 100, how much the other road user will have to shift its position (move to the right or left), a headway time which corresponds to an estimated reaction time for the other road user, whether another vehicle will have to enter a crosswalk, whether another road user will have to enter an occluded crosswalk, maximum amount that any other road user will need to exceed the speed limit, as well as an uncertainty value for how confident the computing devices are in the prediction of the other road user's position and speed.

Each of these factors may be evaluated using a specific scale for that value. For instance, the minimum acceleration (or the maximum allowed deceleration) may range from −2 m/s2 to −8 m/s2 or more or less, maximum acceleration may range from 2 m/s2 to 3 m/s2, jerk may range from 2 m/s2 to 8 m/s2 or more or less, lateral acceleration may range from 3 m/s2 to 4 m/s2, exceeding the speed limit may range from 0% to 12% or more or less, proximity speed limit may range from 0% to 12% or more or less, headway may range from 0.75 seconds to 0 seconds or more or less, uncertainty may range from a standard deviation of 0.8 to a standard deviation of 0 or more or less.

In addition, these scales may be adjusted under certain circumstances. For instance, when two vehicles are interacting, the vehicle which has precedence (i.e. the right of way) may be allowed or expected to behave more assertively, whereas the vehicle which does not have precedence (i.e. does not have the right of way) may be allowed or expected to behave more cooperatively. In that regard, the scales may be adjusted accordingly to precedence. In this regard, the scale for the maximum allowed deceleration may be increased for a vehicle which does not have precedence, for instance the scale may then range from −2 m/s2 to −10 m/s2 or more or less. Similarly, the scale for the maximum acceleration may increase for a vehicle which does have precedence, for instance, the scale may then range from 2 m/s2 to 10 m/s2 or more or less.

In order to determine a speed profile for a given discomfort value, the computing devices may generate a plurality of constraints based on the aforementioned factors and corresponding values. For instance, these constraints may be generated based on objects in the vehicle's environment as well as their predicted behaviors or trajectories. For instance, constraints may include limits on velocity, such as road speed limits and lateral acceleration limits in turns, minimum distances to other objects, slow regions (defined by map information), etc. For example, the computing devices 110 and/or the perception system 172 may identify objects such as vehicles, bicycles, pedestrians, debris, etc. and estimate one or more future predicted trajectories for those objects. The constraints may be generated in order to prevent the vehicle's computing devices from determining a speed profile that would cause the geometry component of the trajectory (i.e. where the vehicle 100 is expected to be) with the predicted trajectories of those objects. In some instances, areas corresponding to the predicted trajectories for an object may be used to determine a constraint for that object. For example, if a pedestrian is predicted to cross the vehicle's trajectory at a given location, then that location and the time the pedestrian is expected to enter and leave the vehicle's trajectory may define a speed constraint.

In some instances, the constraints may be generated based only on objects that are in front of and/or alongside of the vehicle. This may include, for instance, only those vehicles that are in front of and/or alongside of the vehicle and that also have predicted trajectories that are likely to cross with the trajectory of the vehicle. In that regard, objects behind the vehicle may be ignored. However, in some instances, objects behind the vehicle, such as tailgating vehicles, may actually be relevant to determining a speed plan for the vehicle. As such, the computing devices 110 may determine that an object is a tailgating vehicle if that object meets a plurality of requirements. For instance, these plurality of requirements may include that the object is identified as a vehicle that the object is located behind the vehicle and in the same lane as the vehicle, that the object is traveling a certain speed relative to the speed of the vehicle 100, that the object is within a certain distance behind the vehicle, etc. In this regard, for any object located in a lane behind the vehicle 100, the computing devices 110 may determine whether that object is a tailgating vehicle. This assessment may be updated periodically, for instance, such as every time the computing devices 110 receive updated sensor data from the perception system 172.

Similarly, when an object located behind the vehicle is determined to be a tailgating vehicle, a constraint may also be generated for that object. However, the values used for a constraint for a tailgating vehicle may be different than those for a typical vehicle. For instance, for a tailgating vehicle, the computing devices 110 may assume a greater, in terms of more braking and/or less reaction time, response to the actions of the vehicle 100 than for other types of vehicles. In other words, a tailgating vehicle is more likely to slow down for the vehicle 100 than other vehicles as the vehicle 100 would be unlikely to be expected to react strongly to a tailgating vehicle behind the vehicle 100 as the tailgating vehicle would be expected to react for the vehicle 100.

The computing devices may determine whether there is a solution (i.e. a speed profile) that will satisfy or meet a maximum allowable discomfort value and satisfy the values for all of the constraints. For instance, for a given maximum allowable discomfort value, the computing devices 110 may return a speed profile for that maximum allowable discomfort value or a failure if within the limits of that maximum allowable discomfort value no solution can be found. This results in the computing devices choosing a speed plan with the lowest feasible maximum allowable discomfort value.

For situations with no constraints to consider, for instance, such as the example of FIG. 6, the computing devices may be able to find a speed profile at the lowest maximum allowable discomfort value and therefore would not need to evaluate higher maximum allowable discomfort values. In other words, where there are no other road users such as vehicles, bicyclists, or pedestrians proximate to the vehicle 100, the computing devices 110 will typically be able to find a speed profile that meets an initial or the lowest maximum allowable discomfort value, for instance zero discomfort.

When the vehicle 100's trajectory comes close to other such road users, such as vehicles or pedestrians, the vehicle should be controlled at slower speeds for safety reasons. Accordingly, the desired speed may be a function of the type of other road user (for instance, vehicle, bicyclist, or pedestrian) and how close the vehicle 100 can get to that other object. By increasing the maximum allowable discomfort values, the vehicle 100 may even be allowed to exceed the desired speed slightly to avoid a collision with such other road users.

The computing devices may search for speed profiles iteratively using different maximum allowable discomfort values. For instance, the computing devices start with a first and lowest maximum allowable discomfort value, such as zero. If the computing devices are unable to find a speed profile at that maximum allowable discomfort value, the computing devices may increase the maximum allowable discomfort value until a solution is found. For instance, the maximum allowable discomfort value may be increased from 0 by increments of 0.1, 0.2, 0.25, 0.5, or more or less, until the maximum allowable discomfort value reaches some absolute maximum value, such as 0.5, 1, 2, 10 or more or less. In the example of increments of 0.25 and a maximum value of 1, there would be 5 discrete levels, although additional or different levels, increments, and absolute maximum values may also be used.

Each time the maximum allowable discomfort is increased, so too, the values for the various factors of each constraint may be adjusted. For instance, for a typical vehicle, the reaction delay at 0 discomfort may be expected to be 2 seconds, whereas for a tailgating vehicle, the reaction delay may be expected to be 1.5 seconds. At a discomfort value of 1, for a typical vehicle, the reaction delay may be expected to be 1.5 seconds and for a tailgating vehicle, the reaction delay may be expected to be 0 seconds. As another example, at a discomfort value of 0, the maximum allowed deceleration for a tailgating vehicle may be −2 m/s/s, and at a discomfort value of 1, the maximum allowed deceleration for a tailgating vehicle may be −8 m/s/s. For a typical vehicle, at a discomfort value of 0 the maximum allowed deceleration may be −1 m/s/s, and at a discomfort value of 1, the maximum allowed deceleration may be −6 m/s/s. In the event that the typical vehicle has precedence (as discussed above), at a discomfort value of 1, the maximum allowed deceleration may be −4 m/s/s.

For each given maximum allowable discomfort value, the vehicle's computing devices may start with an initial speed profile that moves as fast as possible given one or more constraints.

This initial profile may not necessarily satisfy all of the constraints for all of the other objects, including tailgating vehicles. Those constraints are resolved one by one. If the computing devices determine one of the constraints is violated, the computing devices attempt to yield to the object relating to that constraint by slowing the speed profile down. When slowing the speed profile down, the computing devices may make the vehicle deceleration (or brake) as late as possible and speed up again as soon as possible after the constraint. Thus, the speed profile is still moving as fast as possible while satisfying the constraint. This is important because as long as computing devices understand that the speed profiles are always moving as fast as possible, slowing the speed profile down is the only option to make the profile satisfy a violated constraint. If the computing devices are able to slow down the speed profile and satisfy the constraint, the computing devices repeat the process with the next violated constraint until all constraints are satisfied. If the computing devices can't satisfy the constraints even when braking as hard and as early as possible, the maximum allowable discomfort value may be increased and new speed profiles generated. However, if the speed profile can either pass or yield to another vehicle at the given maximum allowable discomfort value, the computing devices may select a default action, such as speeding up to pass the other object.

The computing device may then control the vehicle according to the speed profile that meets the smallest maximum allowable discomfort value. If for a given maximum allowable discomfort value the vehicle may use speed profiles for either passing or yielding, the vehicle's computing devices may choose the speed profile for passing with the highest speed. This speed profile may then be used in combination with the geometry component to control the vehicle.

The discomfort value may be used when generating all speed profiles, but can be especially useful when the autonomous vehicle in certain types of situation which requires that the autonomous vehicle either speed up or slow down while interacting with another vehicle. These situations may include making a right turn in front of or behind another vehicle, merging in front of or behind another vehicle, crossing the path of a another vehicle in front of or behind the other vehicle, and so on. Again, by using the discomfort values, such decisions may be made automatically rather than by requiring the computing devices to make a specific choice and thereafter determining a speed plan.

Figure 7:
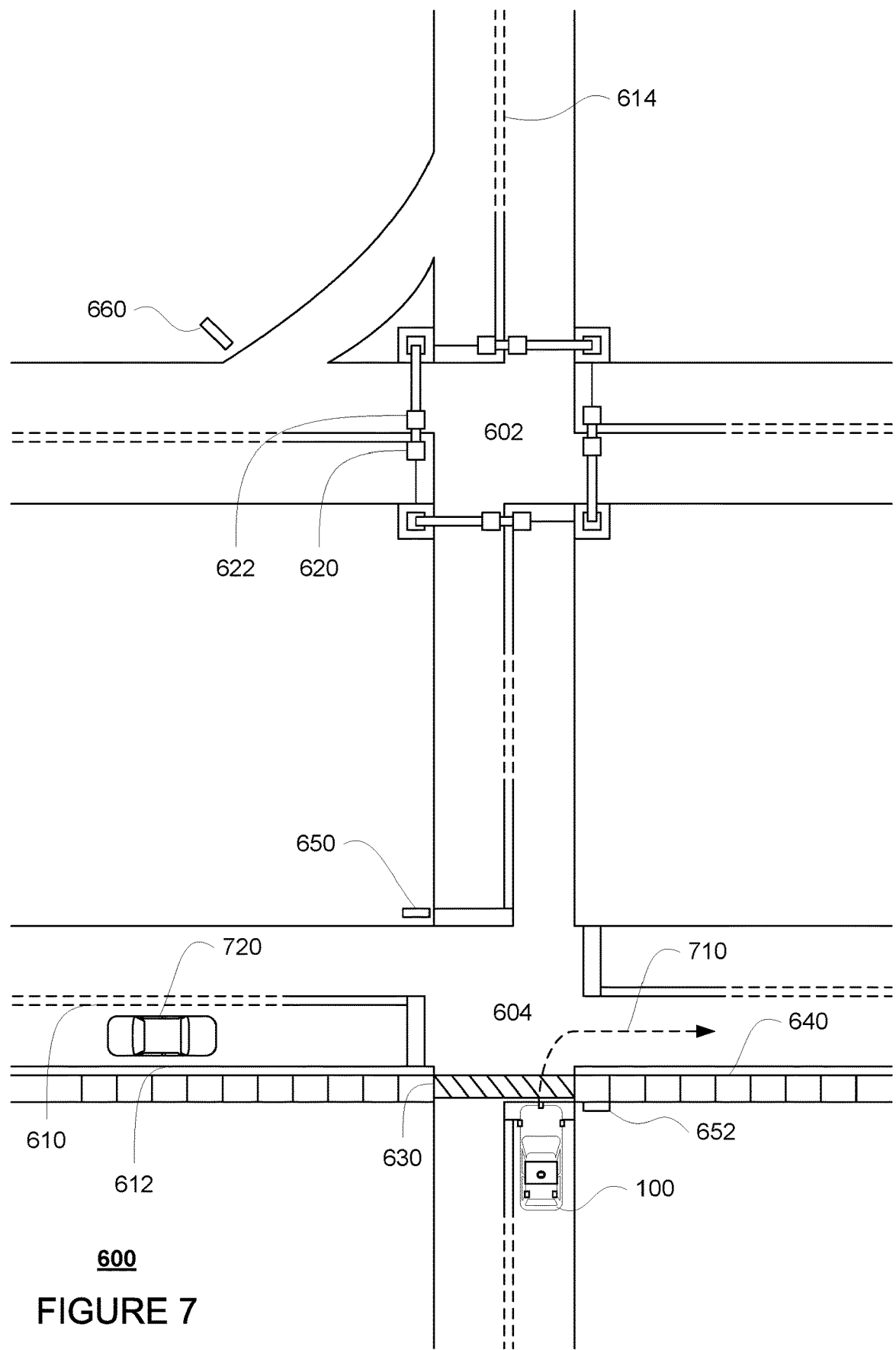
FIG. 7 is an example bird's eye view of a geographic area in accordance with aspects of the disclosure.

In the example of the right turn, the computing devices may need to decide between a speed profile that includes speeding up to allow the vehicle to turn in front of the other vehicle and a speed profile that includes decreasing speed to allow the vehicle yield to the other vehicle. For instance, turning to FIG. 7, vehicle 100 must make a right turn at intersection 604 in order to follow trajectory 710. Different speed profiles may cause vehicle 100 to pass in front of or behind vehicle 720. For instance, if the speed profile causes the vehicle to move along the trajectory immediately, for example, increasing its speed, the vehicle 100 may pass in front of vehicle 720. Similarly, if the speed profile causes the vehicle to wait or move very slowly, the vehicle 100 may pass behind the vehicle 720. By using a maximum allowable discomfort value as described above, such decisions may be made automatically, by considering discomfort to passenger or occupants of both vehicle 100 and vehicle 720, rather than by requiring the computing devices to make a specific choice and thereafter determining a speed plan.

Figure 8:
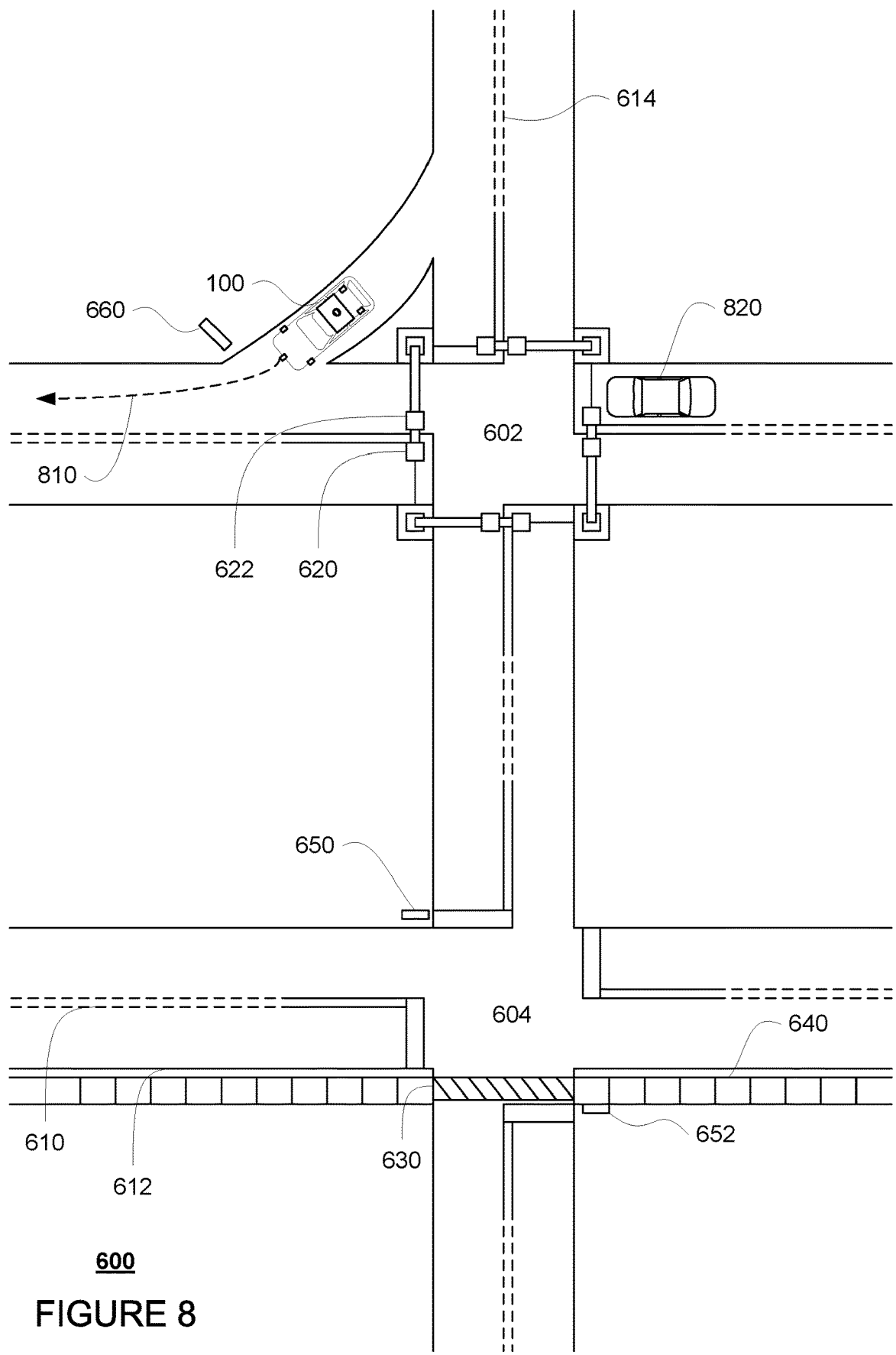
FIG. 8 is an example bird's eye view of a geographic area in accordance with aspects of the disclosure.

Similarly in the example of a merge, the computing devices may need to decide between a speed profile that includes increasing speed to get over in front of the other vehicle and a speed profile that includes decreasing speed to get over behind the other vehicle. For instance, turning to FIG. 8, vehicle 100 must merge into traffic in order to follow trajectory 810. Different speed profiles may cause vehicle 100 to merge in front of or behind vehicle 820. For instance, if the speed profile causes the vehicle to move along the trajectory immediately, for example, increasing its speed, the vehicle 100 may merge in front of vehicle 820. Similarly, if the speed profile causes the vehicle to wait or move very slowly, the vehicle 100 may merge behind the vehicle 820. Again, by using a maximum allowable discomfort value as described above, such decisions may be made automatically, by considering discomfort to passenger or occupants of both vehicle 100 and vehicle 820, rather than by requiring the computing devices to make a specific choice and thereafter determining a speed plan.

Figure 9:
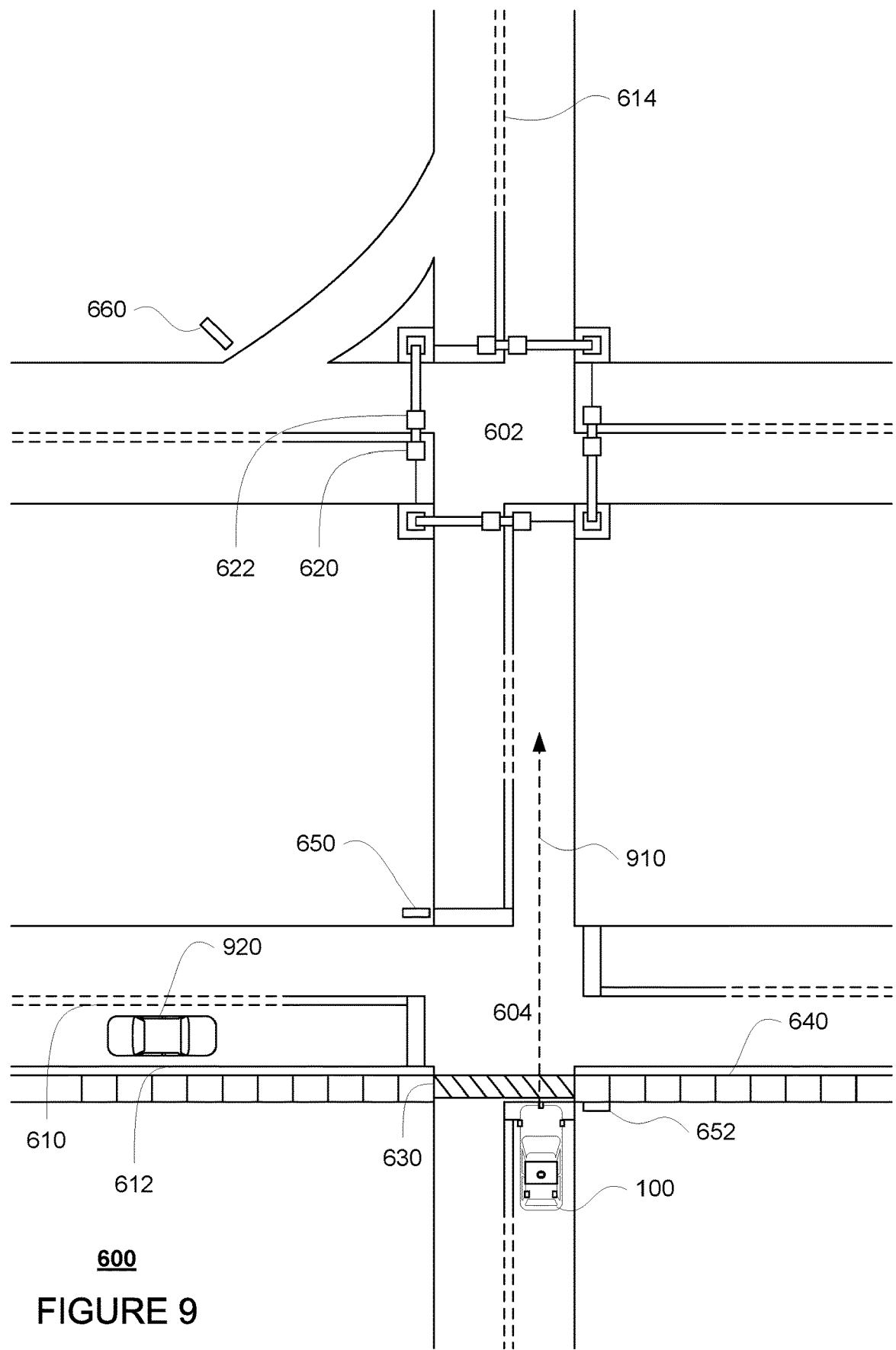
FIG. 9 is an example bird's eye view of a geographic area in accordance with aspects of the disclosure.

And again, in the example of crossing the path of another vehicle, the computing devices may need to decide between a speed profile that includes increasing speed to cross over the path of the other vehicle before the in front of that vehicle and a speed profile that includes decreasing speed to cross the path of the other vehicle after the vehicle behind the other vehicle. For instance, turning to FIG. 9, vehicle 100 must proceed straight through intersection 604 in order to follow trajectory 910. Different speed profiles may cause vehicle 100 to pass in front of or behind vehicle 920. For instance, if the speed profile causes the vehicle to move along the trajectory immediately, for example, increasing its speed, the vehicle 100 may cross the path of vehicle 920 in front of vehicle 920. Similarly, if the speed profile causes the vehicle to wait or move very slowly, the vehicle 100 may cross the path of vehicle 920 behind the vehicle 920. Again, by using a maximum allowable discomfort value as described above, such decisions may be made automatically, by considering discomfort to passenger or occupants of both vehicle 100 and vehicle 920, rather than by requiring the computing devices to make a specific choice and thereafter determining a speed plan.

As the discomfort value increases, certain constraints may be "phased out" or their values may be such that they do not affect the speed profile in order to allow the vehicle to disregard or ignore the constraint. This behavior may enable the computing devices 110 to essentially make tradeoffs between which constraints are more important than others. As such, tailgating vehicles may also affect the behavior of the vehicle, for instance, by causing the computing devices 110 to adjust or even ignore some constraints. For instance, if the vehicle 100 is approaching an intersection, a tailgating vehicle may indirectly cause the computing devices 110 to adjust a constraint related to stopping at a stop line for the intersection because the tailgater is not decelerating fast enough or at all.

Figure 10:
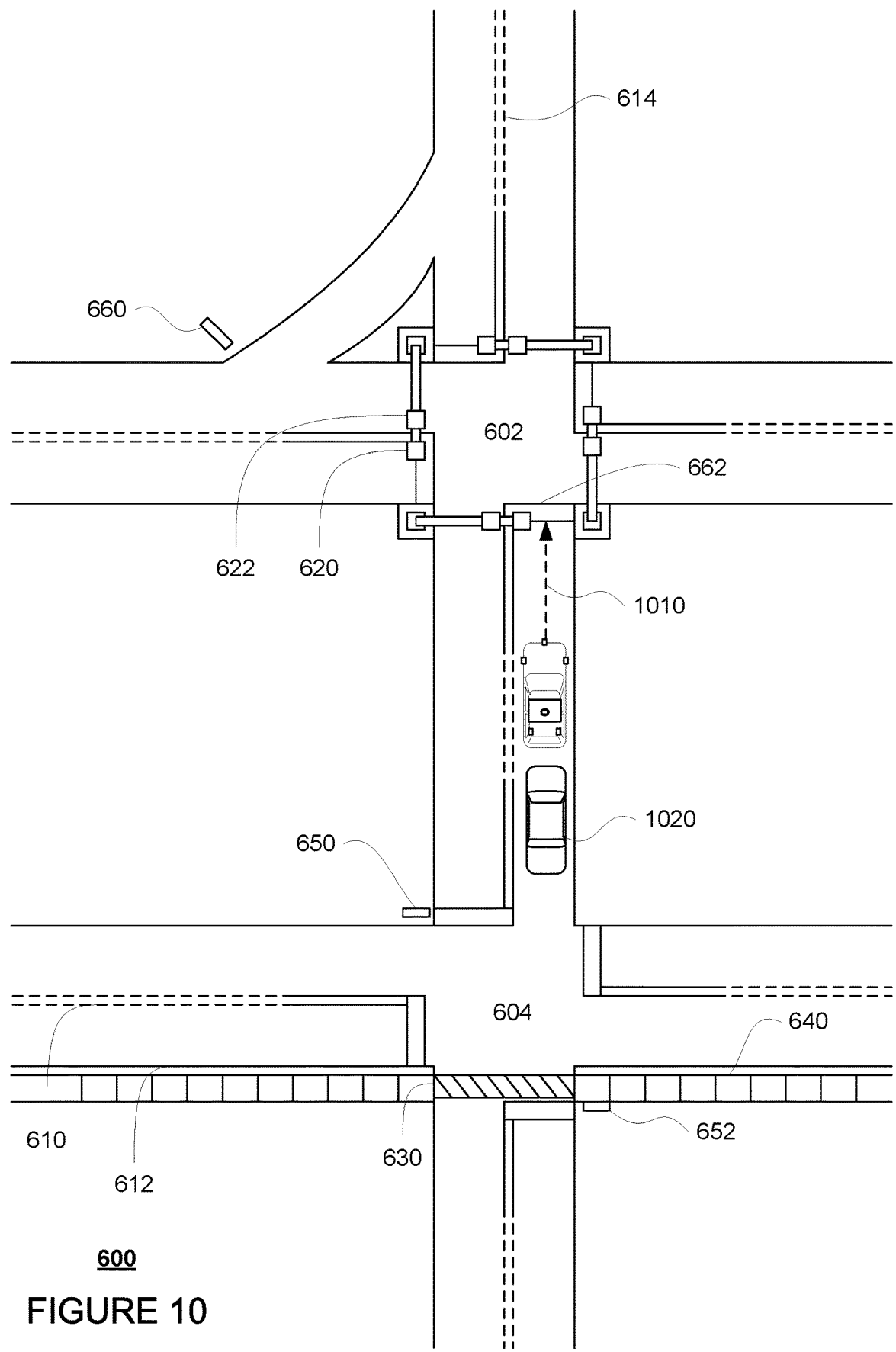
FIG. 10 is an example bird's eye view of a geographic area in accordance with aspects of the disclosure.

For example, turning to FIG. 10, vehicle 100 is approaching intersection 602 and following trajectory 1010 through intersection 602. At this point, a traffic light controlling the lane in which vehicle 100 is located is red or is yellow (i.e. is about to turn red). As such, computing devices 110 may need to stop vehicle 100 at the intersection 602. In addition, vehicle 1020 is behind vehicle 100 and in the same lane as vehicle 100. In this example, the computing devices 110 may determine that vehicle 1020 is a tailgating vehicle as discussed above. As such, the computing devices 110 may adjust the constraint for stopping at the stop line 662, for instance, by moving a location of the constraint to a few feet beyond the stop line. Alternatively, the computing devices 110 may simply ignore the constraint completely. By adjusting or ignoring, the computing devices 110 may cause the vehicle 100 to stop a few feet past the stop line 662 or to move forward a few feet into intersection 602 in order to avoid being hit (i.e. rear-ended) by the tailgating vehicle 1020. Of course, the vehicle 100 may not necessary disregard its own safety or that of others by running a stop sign or passing through an intersection while traffic light controlling the lane in which vehicle 100 is located is red or about to turn red. For instance, to ensure safety with respect to cross-traffic, moving into the intersection may only be allowed while a traffic light controlling the lane in which vehicle 100 is located is still yellow (i.e. the light has not yet turned red).

With regard to the uncertainty factor, in some circumstances for lower maximum allowable discomfort values, the vehicle's computing devices may adjust the vehicle's behavior to proceed more cautiously. For instance, at lower maximum allowable discomfort values, the computing devices may apply a "buffer" constraint around other objects future states that represents an uncertainty about their future trajectory. As an example, this buffer constraint may be generated such that there is a 60% or more or less likelihood that the other object will stay within the inflated constraint. For higher maximum allowable discomfort values, this buffer constraint may be reduced.

Figure 11:
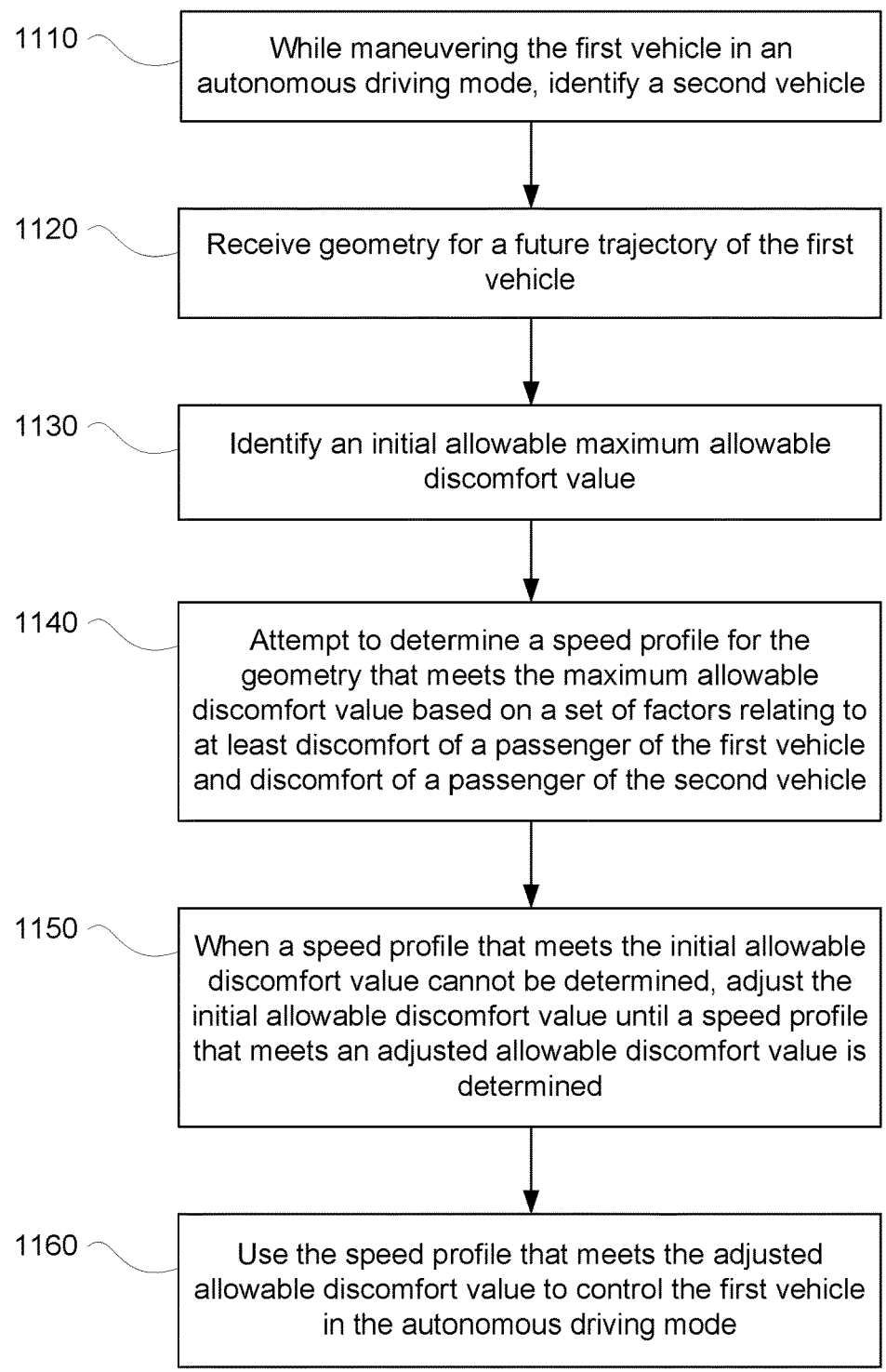
FIG. 11 is an example flow diagram in accordance with aspects of the disclosure.

FIG. 11 includes an example flow diagram 1100 of some of the examples for controlling a first vehicle, such as vehicle 100, which may be performed by one or more processors such as processors 120 of computing devices 110. For instance, at block 1110, while maneuvering the first vehicle in an autonomous driving mode, a second vehicle is identified. At block 1120, geometry for a future trajectory of the first vehicle is received. At block 1130, an initial allowable discomfort value is identified. At block 1140, determining a speed profile for the geometry that meets the initial allowable discomfort value is attempted based on a set of factors relating to at least discomfort of a passenger or occupant of the first vehicle and discomfort of a passenger or occupant of the second vehicle. At block 1150, when a speed profile that meets the initial allowable discomfort value cannot be determined, the initial allowable discomfort value is adjusted until a speed profile that meets an adjusted allowable discomfort value is determined. At block 1160, the speed profile that meets the adjusted allowable discomfort value is used to control the vehicle in the autonomous driving mode.

Figure 12:
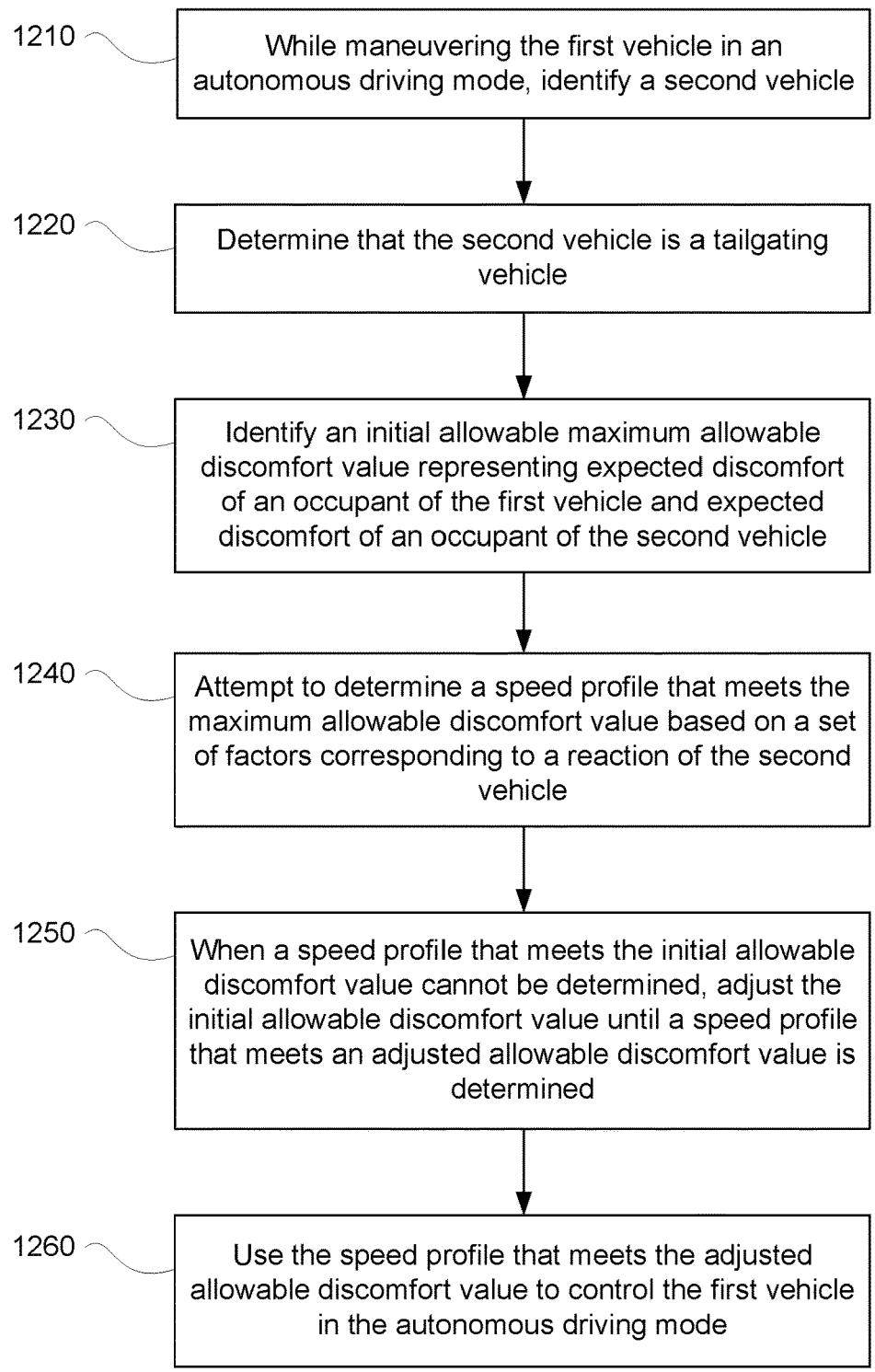
FIG. 12 is an example flow diagram in accordance with aspects of the disclosure.

FIG. 12 includes an example flow diagram 1200 of some of the examples for controlling a first vehicle, such as vehicle 100, which may be performed by one or more processors such as processors 120 of computing devices 110. At block 1210, while the vehicle is maneuvered in the autonomous driving mode, a second vehicle is identified. At block 1220, the second vehicle is determined to be a tailgating vehicle. An initial allowable discomfort value representing expected discomfort of an occupant of the first vehicle and expected discomfort of an occupant of the second vehicle is determined at block 1230. At block 1240, determining a speed profile that meets the initial allowable discomfort value is attempted based on a set of factors corresponding to a reaction of the second vehicle. At block 1250, when a speed profile that meets the initial allowable discomfort value cannot be determined, the initial allowable discomfort value is adjusted until a speed profile that meets an adjusted allowable discomfort value is determined. At block 1260, the speed profile that meets the adjusted allowable discomfort value is used to control the first vehicle in the autonomous driving mode.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of

The invention claimed is:

1. A method of controlling a first vehicle, the method comprising:
    while maneuvering the first vehicle in an autonomous driving mode, identifying, by one or more processors, a second vehicle;
    determining, by the one or more processors, that the second vehicle is a tailgating vehicle;
    identifying, by the one or more processors, an initial allowable discomfort value representing expected discomfort of an occupant of the first vehicle and expected discomfort of an occupant of the second vehicle;
    attempting, by the one or more processors, to determine a speed profile for a future trajectory of the first vehicle that meets the initial allowable discomfort value based on a set of factors corresponding to a reaction of the tailgating vehicle;
    when a speed profile that meets the initial allowable discomfort value cannot be determined, adjusting, by the one or more processors, the initial allowable discomfort value until a speed profile that meets an adjusted allowable discomfort value is determined; and
    using, by the one or more processors, the speed profile that meets the adjusted allowable discomfort value to control the first vehicle in the autonomous driving mode.

2. The method of claim 1, wherein the set of factors includes a maximum allowed deceleration for the second vehicle.

3. The method of claim 2, further comprising, when the initial allowable discomfort value is adjusted, the maximum allowed deceleration for the second vehicle is also adjusted.

4. The method of claim 3, wherein adjusting the maximum allowed deceleration includes increasing a limit on expected deceleration for the second vehicle.

5. The method of claim 1, wherein the set of factors includes a reaction time for the second vehicle.

6. The method of claim 5, further comprising, when the initial allowable discomfort value is adjusted, the reaction time for the second vehicle is also adjusted.

7. The method of claim 6, wherein adjusting the reaction time includes decreasing the reaction time.

8. The method of claim 1, wherein the set of factors further includes a constraint for stopping the first vehicle at an intersection.

9. The method of claim 8, wherein when the initial allowable discomfort value is adjusted, the constraint for stopping the first vehicle at an intersection is adjusted.

10. The method of claim 8, wherein when the initial allowable discomfort value is adjusted, the constraint for stopping the first vehicle at an intersection is ignored.

11. The method of claim 1, wherein determining that the second vehicle is a tailgating vehicle is based on a location of the second vehicle with respect to the first vehicle.

12. The method of claim 11, wherein determining that the second vehicle is a tailgating vehicle is based on a speed of the second vehicle.

13. The method of claim 1, further comprising, periodically updating the determination of whether the second vehicle is a tailgating vehicle.

14. The method of claim 1, further comprising:
    while maneuvering the first vehicle in an autonomous driving mode, identifying, by one or more processors, a third vehicle; and
    determine, by the one or more processors, that the third vehicle is not a tailgating vehicle, and wherein attempting to determine the speed profile for the future trajectory that meets the initial allowable discomfort value is further based on a second set of factors relating to the third vehicle.

15. The method of claim 14, wherein the set of factors includes a first value for a maximum allowed deceleration for the second vehicle, and the second set of factors includes a second value for the maximum allowed deceleration for the third vehicle, and the second value is different from the first value.

16. The method of claim 15, wherein the first value allows for a first limit on expected deceleration for the second vehicle, the second value allows for a second limit on expected deceleration for the third vehicle, and the first limit is less than the second limit.

17. The method of claim 14, wherein the set of factors includes a first value for a reaction time for the second vehicle, and the second set of factors includes a second value for the reaction time for the third vehicle, and the second value is different from the first value.

18. The method of claim 17, wherein the first value is less than the second value, such that the reaction time of the second vehicle is less than the reaction time of the third vehicle.

19. A system for controlling a first vehicle, the system comprising one or more processors configured to:
    while maneuvering the first vehicle in an autonomous driving mode, identify a second vehicle;
    determine that the second vehicle is a tailgating vehicle;
    identify an initial allowable discomfort value representing expected discomfort of an occupant of the first vehicle and expected discomfort of an occupant of the second vehicle;
    attempt to determine a speed profile for a future trajectory of the first vehicle that meets the initial allowable discomfort value based on a set of factors corresponding to a reaction of the tailgating vehicle;
    when a speed profile that meets the initial allowable discomfort value cannot be determined, adjust the initial allowable discomfort value until a speed profile that meets an adjusted allowable discomfort value is determined; and
    use the speed profile that meets the adjusted allowable discomfort value to control the first vehicle in the autonomous driving mode.

20. The system of claim 19, wherein the one or more processors are further configured to:
    while maneuvering the first vehicle in an autonomous driving mode, identify a third vehicle; and
    determining that the third vehicle is not a tailgating vehicle, and wherein attempting to determine the speed profile for the future trajectory that meets the initial allowable discomfort value is further based on a second set of factors relating to the third vehicle, the set of factors includes a first value for a maximum allowed deceleration for the second vehicle, the second set of factors includes a second value for the maximum allowed deceleration for the third vehicle, and the second value is different from the first value.

21. The system of claim 19, further comprising the first vehicle.

* * * * *